US008536482B2

(12) United States Patent
Link

(10) Patent No.: US 8,536,482 B2
(45) Date of Patent: Sep. 17, 2013

(54) LASER PROCESSING MACHINES

(75) Inventor: Gerhard Link, Knittlingen (DE)

(73) Assignee: TRUMPF Laser -und Systemtechnik GmbH, Ditzingen (DE)

( * ) Notice: Subject to any disclaimer, the term of this patent is extended or adjusted under 35 U.S.C. 154(b) by 1160 days.

(21) Appl. No.: 12/266,776

(22) Filed: Nov. 7, 2008

(65) Prior Publication Data

US 2009/0071946 A1    Mar. 19, 2009

Related U.S. Application Data

(63) Continuation of application No. PCT/EP2006/004325, filed on May 9, 2006.

(51) Int. Cl.
*B23K 26/00* (2006.01)
*B65G 1/00* (2006.01)

(52) U.S. Cl.
USPC .............. 219/121.6; 219/121.85; 74/469

(58) Field of Classification Search
USPC .............. 219/121.63–121.72, 121.82, 121.6, 219/121.85; 74/469; 403/345
See application file for complete search history.

(56) References Cited

U.S. PATENT DOCUMENTS

| | | | | | |
|---|---|---|---|---|---|
| 1,843,536 A | * | 2/1932 | Barbieri | ........................... | 53/366 |
| 2,346,724 A | * | 4/1944 | Briney, Jr. | ..................... | 451/222 |
| 2,450,004 A | * | 9/1948 | Knox | ................................ | 82/152 |
| 2,467,136 A | * | 4/1949 | Jones | ............................. | 198/583 |
| 3,383,491 A | | 5/1968 | Muncheryan | | |
| 3,404,350 A | * | 10/1968 | Muncheryan | ..................... | 372/72 |
| 4,374,497 A | * | 2/1983 | Harmand | ........................... | 108/4 |
| 4,448,528 A | * | 5/1984 | McManus | ..................... | 356/250 |
| 4,760,583 A | | 7/1988 | Sasnett et al. | | |
| 4,833,764 A | * | 5/1989 | Muller | ................................ | 29/40 |
| 4,940,880 A | | 7/1990 | Klingel et al. | | |
| 4,976,598 A | | 12/1990 | Hehl | | |
| 5,074,323 A | * | 12/1991 | Chapman et al. | ............. | 134/181 |
| 6,013,096 A | * | 1/2000 | Tucek | .............................. | 607/89 |
| 6,644,156 B2 | * | 11/2003 | Villacis | ........................... | 83/425 |
| 2002/0104935 A1 | | 8/2002 | Schweizer | | |
| 2005/0224471 A1 | | 10/2005 | Chen et al. | | |

FOREIGN PATENT DOCUMENTS

| | | |
|---|---|---|
| DE | 3114979 | 10/1982 |
| EP | 0943391 | 9/1999 |
| JP | 60037286 | 10/1983 |
| JP | 10156568 | 5/2009 |

OTHER PUBLICATIONS

International Search Report for corresponding PCT Application No. PCT/EP2006/004325, mailed Jan. 31, 2007, 10 pages.
Notification of Transmittal of Translation of the International Preliminary Report on Patentability, mailed Dec. 24, 2008, 7 pages.

* cited by examiner

*Primary Examiner* — Samuel M Heinrich
(74) *Attorney, Agent, or Firm* — Fish & Richardson P.C.

(57) ABSTRACT

A laser processing machine is provided which has a machine frame and a laser generator fastened to the machine frame. The laser generator is movable relative to the machine frame.

17 Claims, 4 Drawing Sheets

LASER PROCESSING MACHINES

CROSS-REFERENCE TO RELATED APPLICATION

This application is a continuation application of and claims priority under 35 U.S.C. §120 to PCT Application No. PCT/EP2006/004325, filed on May 9, 2006. The contents of that priority application are hereby incorporated by reference in its entirety.

TECHNICAL FIELD

The present invention relates to laser processing machines that include a machine frame and a laser generator fitted to the machine frame.

BACKGROUND

Laser processing machines that include a machine frame and a laser generator fitted to the machine frame are generally known.

Generally, the laser generator is mounted securely on the side of the machine frame. This results in an obtrusive contour when the laser processing machine is being transported. If the laser generator is integrated in the laser processing machine there, is no obtrusive contour, however, the laser generator is arranged in such a manner that it is inaccessible.

SUMMARY

In the laser processing machines disclosed herein, the laser generator is arranged on the machine frame in such a manner that there is no obtrusive contour when the laser processing machine is being transported.

That object is achieved by a laser processing machine in which the laser generator is movable relative to the machine frame, and is preferably connected pivotably to the machine frame. The laser generator can be moved or pivoted out of a working position into a transportation position. For example, the laser generator can be fully pre-mounted on the laser processing machine. For transportation, the laser generator is pivoted on the machine frame in such a manner that the laser generator does not project laterally beyond the machine frame. The transportation size is determined purely by the machine frame. When final mounting takes place in situ, the laser generator does not have to be adjusted again. Cables and flexible tubes do not have to be repeatedly mounted. In spite of the pivotability, there is a stable constant association of the laser generator with the machine frame. This association is assisted by a centering aid.

In addition to the working position and the transportation position, the laser generator can also be brought into an appropriate position for maintenance purposes. As a result, the laser generator is readily accessible because the laser generator is not arranged in the interior space of the laser processing machine.

Thus, the laser generator (e.g., a laser resonator) mounted on the machine frame can be pivoted away for transportation purposes. As a result, the outer contour of the machine can be reduced to a favorable transportation size and the installation costs can be reduced.

The details of one or more embodiments of the invention are set forth in the accompanying drawings and the description below. Other features and advantages of the invention will be apparent from the description and drawings, and from the claims.

DETAILED DESCRIPTION

Figure 1:
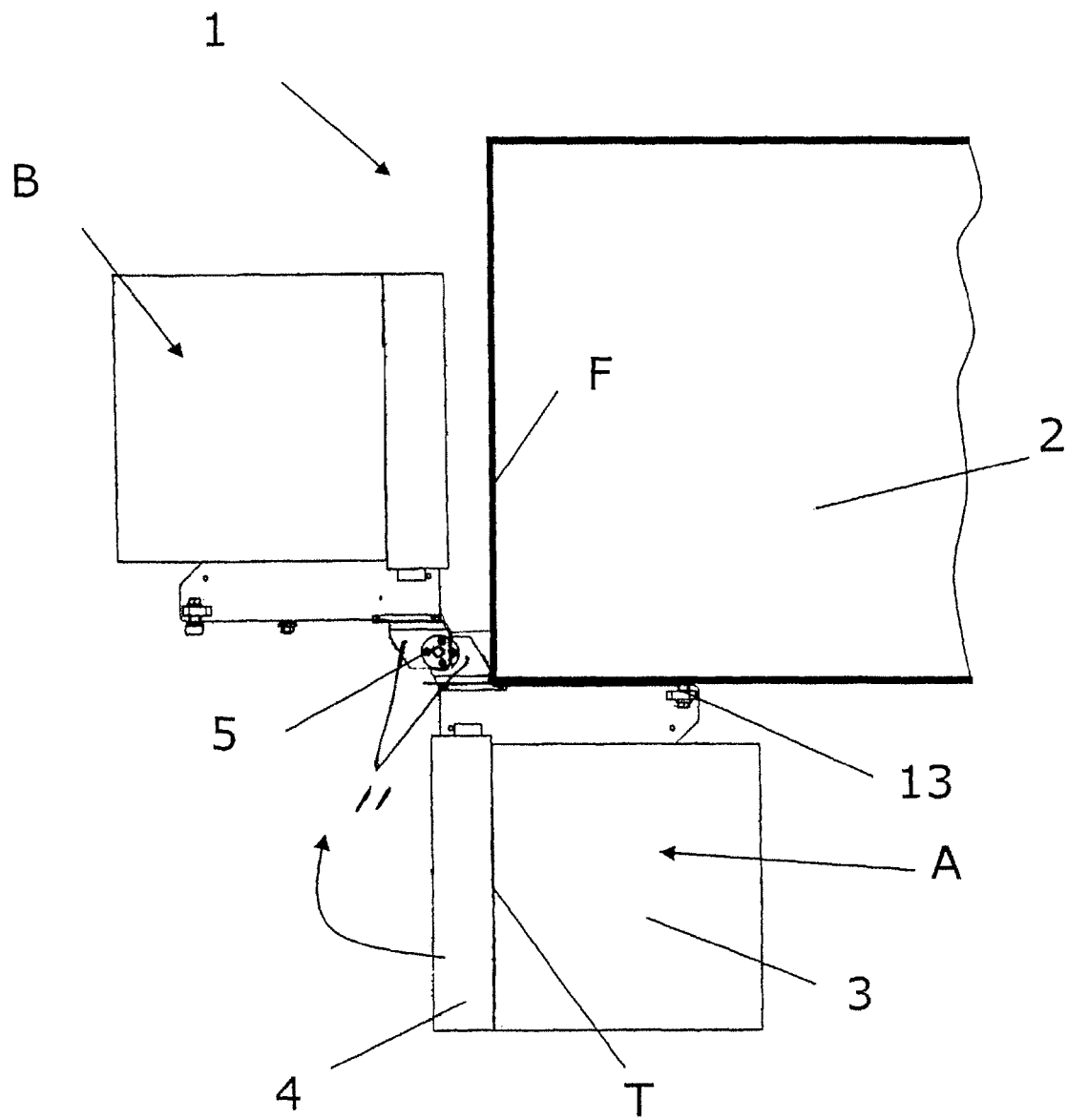
FIG. 1 is a plan view of a laser processing machine.

It can be seen from FIG. 1 that a laser processing machine 1 comprises a machine frame 2 and a laser generator 3. The laser generator 3 is fastened to the machine frame 2 by means of a laser control console 4. The fastening is in a pivotable form, so that the laser generator 3 can be brought into various positions. A shaft 5 can be seen in FIG. 1 as the principal fastening means. The fastening enables the laser console 4 to be pivoted together with the laser generator 3 out of an operating position A into a transportation position B. In the transportation position B, the laser generator 3 is arranged entirely behind the machine frame 2 without the laser generator 3 projecting laterally beyond the machine frame 2. Therefore, when the laser processing machine 1 is being transported, only the width of the machine frame 2 has to be taken into account. The laser generator 3 therefore does not form an obtrusive contour during transportation. For transportation purposes, the laser console 4 is pivoted through approximately 170°-180° (to position B). In order to carry out maintenance work, it is also possible to pivot the laser console 4 through a different angle, for example through approximately 30°. For example, the console may be pivoted to a desired position by the user and stopped manually at the desired position.

The laser console 4 has a support arrangement in the form of support feet 22 which can be rotated upwards away from the floor before pivoting and transporting take place. Alternatively, the support feet may be telescoping members. During transportation, the support feet are rotated downwards or telescoped out, so that the laser control console 4 stands securely on the floor of the transportation vehicle. Likewise, the laser console 4 has a secure footing when the laser processing machine 1 is in operation.

Figure 2:
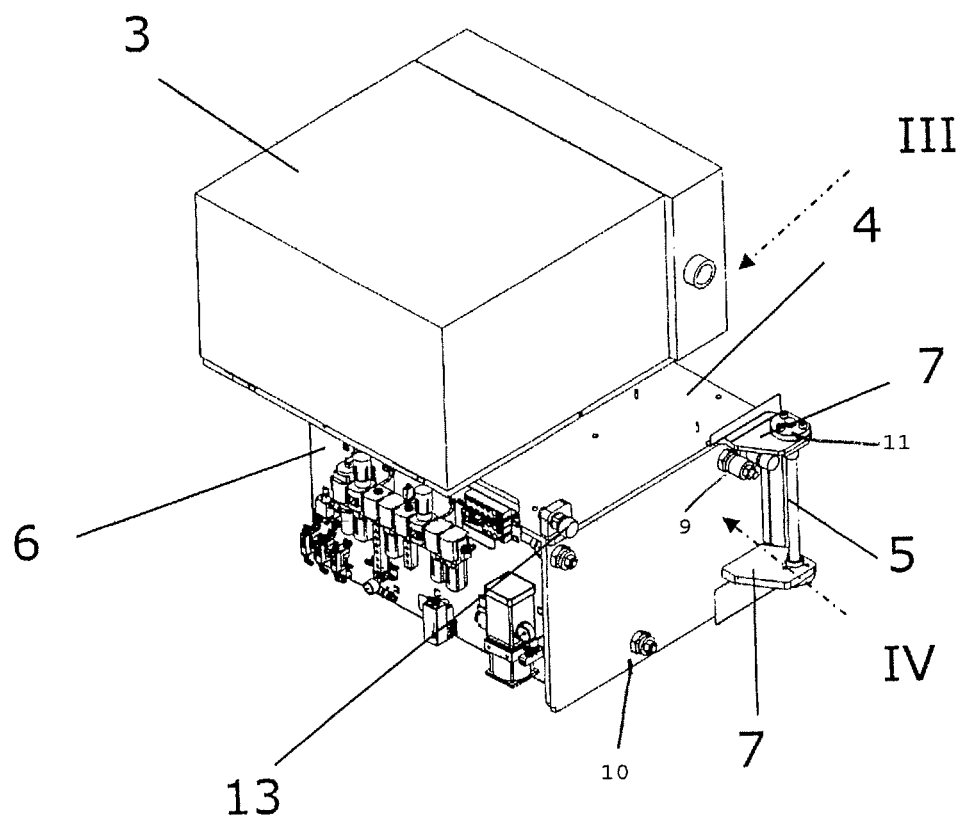
FIG. 2 is a perspective view of a laser console with a laser generator of the laser processing machine according to FIG. 1.

According to FIG. 2, an instrument panel 6 to which, for example, valves, pressure regulators, flow monitors, a pump, etc. can be fitted, is provided on the laser console 4. Electrical cables or lines, e.g., cable 24 shown in FIG. 4, extend in a bundled manner from the instruments on the panel 6. According to FIG. 3, a further instrument panel 8 to which, for example, pressure gauges can be fitted, is provided on the laser console 4.

The laser console 4 has an upper and a lower portion 7. The two portions 7 help to hold the shaft 5, which is fastened pivotably to the machine frame as shown in FIG. 1. The mounting of the laser console 4 on the machine frame 2 includes the alignment of the laser console 4 and the pivoting of the laser console 4.

Figure 3:
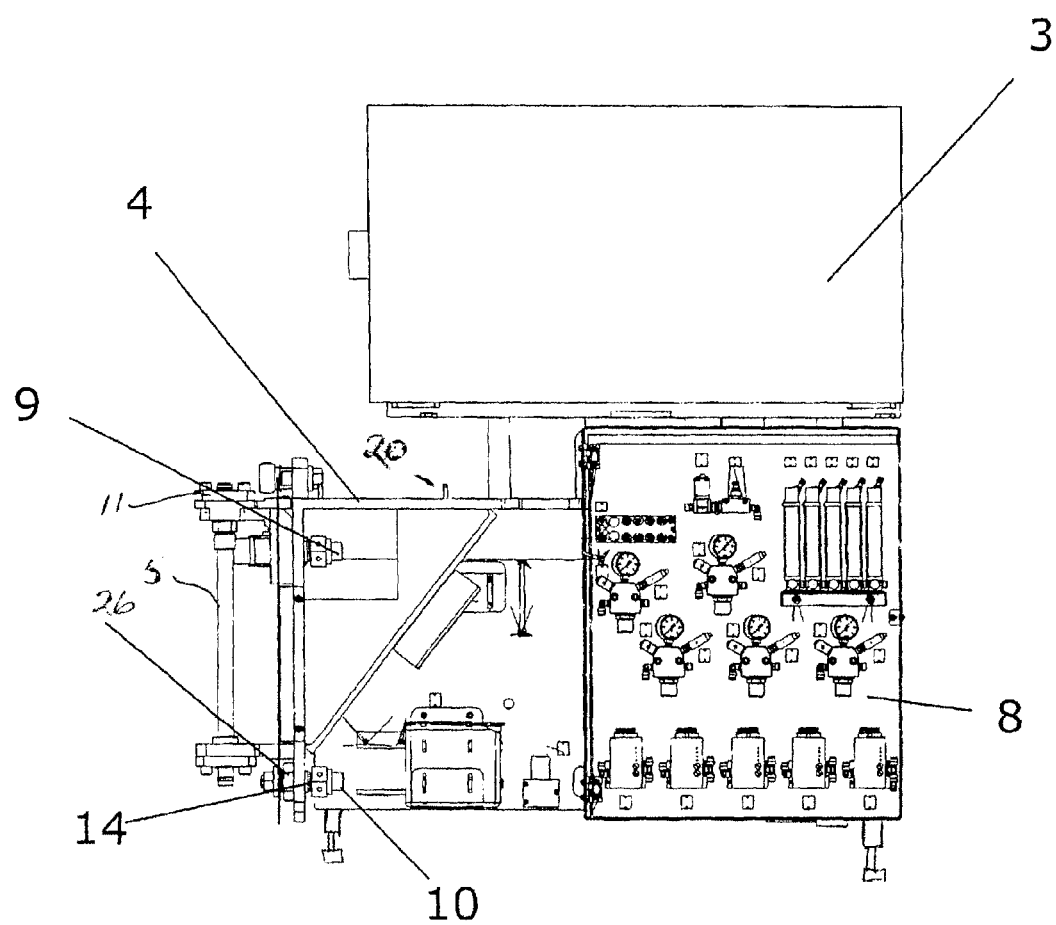
FIG. 3 is a view of the rear side of the laser console according to FIG. 2.
Figure 4:
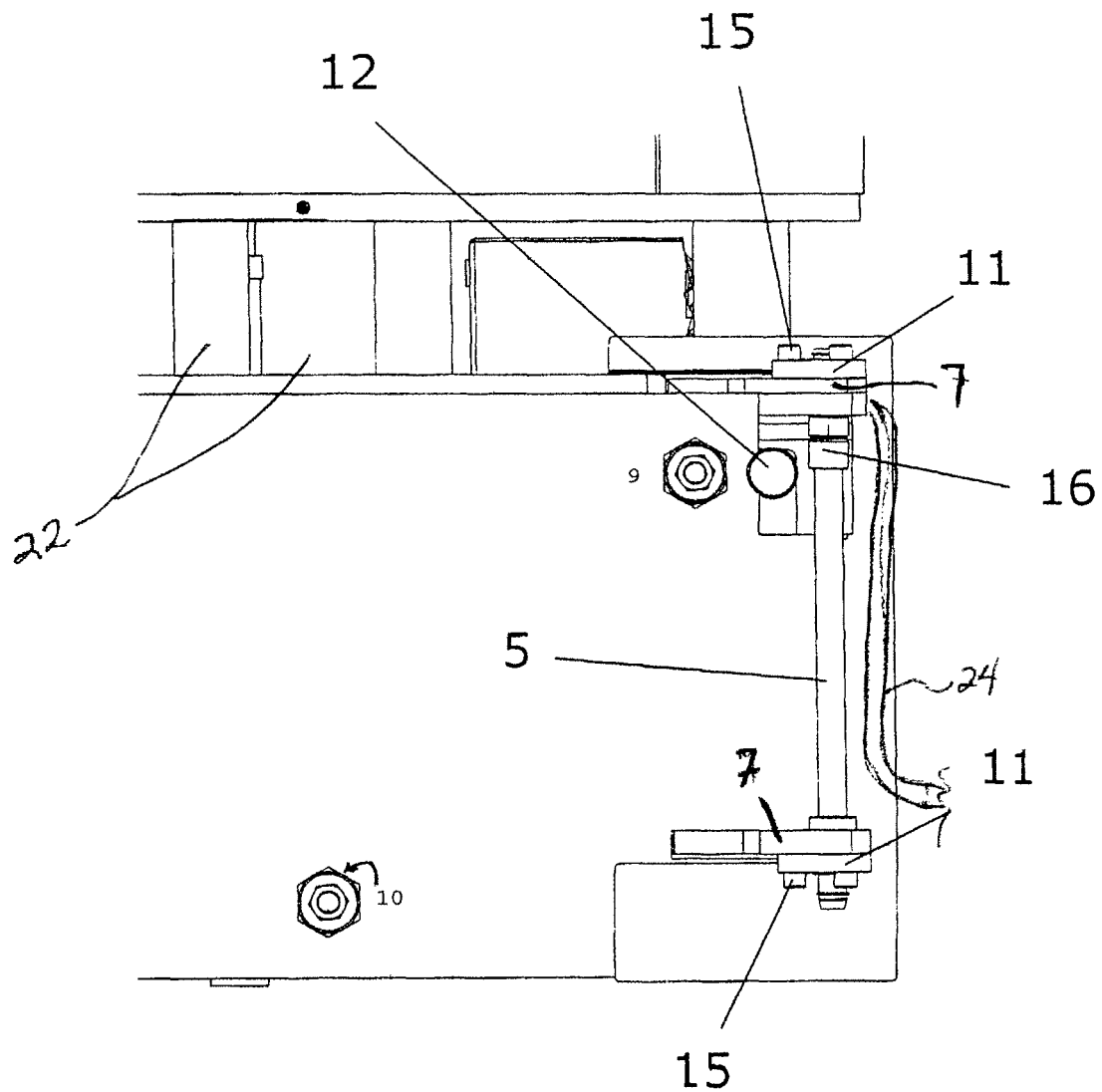
FIG. 4 is an enlarged side view of the laser control console.

For alignment, the laser console 4 can be pre-mounted on the machine frame 2 by way of the shaft 5. For this purpose, the fastening screws 9 and 10, which are used to adjust the alignment of the console relative to the machine frame, are first of all hand-tightened (see FIG. 3). Referring to FIG. 4, the support plates 11 are then loosened so that the shaft 5 is released, with a bolt 12 being used as a centering aid. An eccentric bolt 13 (see FIGS. 1 and 2) is provided in order to align the laser control console 4 parallel with the machine frame. When the eccentric bolt is turned, the laser control console moves slightly up or down, allowing fine adjustments of its position to be made, e.g., so that lines F and T will coincide. In order to adjust the beam direction, the tangential connecting line T of pins (see pin 20, FIG. 3) according to FIG. 1 on the laser control console 4 has to be adjusted relative to the surface F at the end face of the machine frame 2. After arranging the threaded positioning bushings 14 and locking with hexagonal nuts 26, the cylinder head screws 9 and 10 are firmly tightened.

In order to pivot the laser control console 4 into the transportation position, the support plates 11 are fastened by the fastening screws 15 shown in FIG. 4. The fastening screws 9 and 10 according to FIG. 3 are loosened. The laser control console 4 is lifted up by way of a threaded bushing 16. The console is lifted up so as to avoid de-adjustment of the positioning that was previously effected by the eccentric bolt 13. The laser control console 4 can then be pivoted into the transportation position, after which the fastening screws 9 and 10 are tightened to lock the laser console in the transportation position.

The laser control console 4 can be pivoted back into the working position in an analogous manner. The fastening screws 9 and 10 are loosened. The laser control console 4 is pivoted and laid laterally against the centering bolt 12. The laser control console 4 is lowered by way of the threaded bushing 16. The fastening screws 15 are then tightened again. The support plates 11 are loosened. The fastening screws 9 and 10 are likewise tightened.

A number of embodiments of the invention have been described. Nevertheless, it will be understood that various modifications may be made without departing from the spirit and scope of the invention. Accordingly, other embodiments are within the scope of the following claims.

What is claimed is:

1. A laser processing machine comprising:
    a machine frame;
    a shaft fastened to the machine frame;
    a laser console, which is pivotally fitted to the machine frame by the shaft;
    a centering aid positioned to enable the laser console to be laid against the centering aid when pivoted about the shaft; and
    a laser generator mounted on the laser console, wherein the laser generator being mounted on the laser console is pivotable, relative to the machine frame, between a transportation position and a working position, and wherein the laser generator laterally projects beyond the machine frame in the working position and does not laterally project beyond the machine frame in the transportation position.

2. A laser processing machine according to claim 1, further comprising a fastening device configured to lock the pivoted laser console in a working position and in a transportation position.

3. A laser processing machine according to claim 1, further comprising support feet configured to support the laser console.

4. A laser processing machine according to claim 1, further comprising an alignment device configured to align the laser console on the machine frame.

5. A laser processing machine according to claim 1, further comprising instruments or units fitted on the laser console.

6. A laser processing machine according to claim 1, further comprising electrical cables that are guided downwards in a bundled manner, in the region of the shaft, from the instruments or units.

7. A laser processing machine according to claim 1, wherein the shaft is supported by movable support plates.

8. A laser processing machine according to claim 7, further comprising fasteners configured to allow the support plates to be loosened, thereby releasing the shaft.

9. A laser processing machine according to claim 3 wherein the support feet are telescoping.

10. A laser processing machine according to claim 3 wherein the support feet are rotatably mounted on the laser console.

11. A laser processing machine according to claim 4 wherein the alignment device comprises an eccentric bolt.

12. A laser processing machine according to claim 1, further comprising bushings configured to allow the axial position of the shaft to be adjusted.

13. A laser processing machine according to claim 1, wherein the laser generator is further movable into intermediate, maintenance positions.

14. A method of preparing a laser processing machine for transportation, the method comprising:
    obtaining a laser processing machine of claim 1;
    moving the laser generator of the laser processing machine, relative to the machine frame of the machine, into a transportation position; and
    locking the laser generator in the transportation position.

15. A method according to claim 14, wherein moving the laser generator comprises pivoting the laser generator about a pivot shaft.

16. A method of claim 14, further comprising aligning the laser generator with respect to the machine frame.

17. A method of claim 14, wherein moving the laser generator comprises moving a laser console on which the laser generator is mounted.

* * * * *